(12) United States Patent
Wloka

(10) Patent No.: US 8,456,549 B2
(45) Date of Patent: *Jun. 4, 2013

(54) USING A GRAPHICS PROCESSING UNIT TO CORRECT VIDEO AND AUDIO DATA

(75) Inventor: Matthias M. Wloka, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/651,372

(22) Filed: Dec. 31, 2009

(65) Prior Publication Data

US 2010/0171845 A1    Jul. 8, 2010

Related U.S. Application Data

(62) Division of application No. 11/272,242, filed on Nov. 9, 2005, now Pat. No. 7,750,956.

(51) Int. Cl.
  H04N 9/64 (2006.01)
  H04N 5/76 (2006.01)

(52) U.S. Cl.
  USPC .................................. 348/246; 348/231.99

(58) Field of Classification Search
  USPC ............................................ 348/246, 231.4
  See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,685,071 A | 8/1987 | Lee |
| 4,739,495 A | 4/1988 | Levine |
| 4,771,470 A | 9/1988 | Geiser et al. |
| 4,920,428 A | 4/1990 | Lin et al. |
| 4,987,496 A | 1/1991 | Greivenkamp, Jr. |

(Continued)

FOREIGN PATENT DOCUMENTS

| | | |
|---|---|---|
| CN | 1275870 | 12/2000 |
| EP | 0392565 | 10/1990 |

(Continued)

OTHER PUBLICATIONS

Keith R. Slavin; Application as Filed entitled "Efficient Method for Reducing Noise and Blur in a Composite Still Image From a Rolling Shutter Camera"; U.S. Appl. No. 12/069,669; Filed Feb. 11, 2008.

(Continued)

Primary Examiner — Roberto Velez
Assistant Examiner — Joel Fosselman

(57) ABSTRACT

Described is a device (e.g., a cell phone incorporating a digital camera) that incorporates a graphics processing unit (GPU) to process image data in order to increase the quality of a rendered image. The processing power provided by a GPU means that, for example, an unacceptable pixel value (e.g., a pixel value associated with a malfunctioning or dead detector element) can be identified and replaced with a new value that is determined by averaging other pixel values. Also, for example, the device can be calibrated against benchmark data to generate correction factors for each detector element. The correction factors can be applied to the image data on a per-pixel basis. If the device is also adapted to record and/or play digital audio files, the audio performance of the device can be calibrated to determine correction factors for a range of audio frequencies.

15 Claims, 9 Drawing Sheets

U.S. PATENT DOCUMENTS

| | | |
|---|---|---|
| 5,175,430 A | 12/1992 | Enke et al. |
| 5,261,029 A | 11/1993 | Abi-Ezzi et al. |
| 5,305,994 A | 4/1994 | Matsui et al. |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A | 8/1998 | Kim et al. |
| 5,878,174 A | 3/1999 | Stewart et al. |
| 5,903,273 A | 5/1999 | Mochizuki et al. |
| 5,905,530 A | 5/1999 | Yokota et al. |
| 5,995,109 A | 11/1999 | Goel et al. |
| 6,016,474 A | 1/2000 | Kim et al. |
| 6,078,331 A | 6/2000 | Pulli et al. |
| 6,111,988 A | 8/2000 | Horowitz et al. |
| 6,118,547 A | 9/2000 | Tanioka |
| 6,141,740 A | 10/2000 | Mahalingaiah et al. |
| 6,151,457 A | 11/2000 | Kawamoto |
| 6,175,430 B1 | 1/2001 | Ito |
| 6,252,611 B1 | 6/2001 | Kondo |
| 6,256,038 B1 | 7/2001 | Krishnamurthy |
| 6,281,931 B1 | 8/2001 | Tsao et al. |
| 6,289,103 B1 | 9/2001 | Sako et al. |
| 6,314,493 B1 | 11/2001 | Luick |
| 6,319,682 B1 | 11/2001 | Hochman |
| 6,323,934 B1 | 11/2001 | Enomoto |
| 6,392,216 B1 | 5/2002 | Peng-Tan |
| 6,396,397 B1 | 5/2002 | Bos et al. |
| 6,438,664 B1 | 8/2002 | McGrath et al. |
| 6,486,971 B1 | 11/2002 | Kawamoto |
| 6,504,952 B1 | 1/2003 | Takemura et al. |
| 6,584,202 B1 * | 6/2003 | Montag et al. .................. 381/63 |
| 6,594,388 B1 | 7/2003 | Gindele et al. |
| 6,683,643 B1 | 1/2004 | Takayama et al. |
| 6,707,452 B1 | 3/2004 | Veach |
| 6,724,932 B1 | 4/2004 | Ito |
| 6,737,625 B2 * | 5/2004 | Baharav et al. ............ 250/208.1 |
| 6,760,080 B1 | 7/2004 | Moddel et al. |
| 6,785,814 B1 | 8/2004 | Usami et al. |
| 6,806,452 B2 | 10/2004 | Bos et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,950,099 B2 | 9/2005 | Stollnitz et al. |
| 7,009,639 B1 | 3/2006 | Une et al. |
| 7,015,909 B1 | 3/2006 | Morgan, III et al. |
| 7,023,479 B2 | 4/2006 | Hiramatsu et al. |
| 7,088,388 B2 | 8/2006 | MacLean et al. |
| 7,092,018 B1 | 8/2006 | Watanabe |
| 7,106,368 B2 | 9/2006 | Daiku et al. |
| 7,133,041 B2 | 11/2006 | Kaufman et al. |
| 7,133,072 B2 | 11/2006 | Harada |
| 7,146,041 B2 | 12/2006 | Takahashi |
| 7,221,779 B2 | 5/2007 | Kawakami et al. |
| 7,227,586 B2 | 6/2007 | Finlayson et al. |
| 7,245,319 B1 | 7/2007 | Enomoto |
| 7,305,148 B2 | 12/2007 | Spampinato et al. |
| 7,343,040 B2 | 3/2008 | Chanas et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,912,279 B2 | 3/2011 | Hsu et al. |
| 8,049,789 B2 | 11/2011 | Innocent |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0066970 A1 | 4/2004 | Matsugu |
| 2004/0100588 A1 * | 5/2004 | Hartson et al. ................. 348/608 |
| 2004/0101313 A1 | 5/2004 | Akiyama |
| 2004/0109069 A1 | 6/2004 | Kaplinsky et al. |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0099418 A1 | 5/2005 | Cabral et al. |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0133697 A1 | 6/2006 | Uvarov et al. |
| 2006/0176375 A1 | 8/2006 | Hwang et al. |
| 2006/0197664 A1 | 9/2006 | Zhang et al. |
| 2006/0274171 A1 | 12/2006 | Wang |
| 2006/0290794 A1 | 12/2006 | Bergman et al. |
| 2006/0293089 A1 * | 12/2006 | Herberger et al. ............ 455/567 |
| 2007/0091188 A1 | 4/2007 | Chen et al. |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2007/0285530 A1 | 12/2007 | Kim et al. |
| 2008/0030587 A1 | 2/2008 | Helbing |
| 2008/0062164 A1 | 3/2008 | Bassi et al. |
| 2008/0101690 A1 | 5/2008 | Hsu et al. |
| 2008/0143844 A1 | 6/2008 | Innocent |
| 2009/0010539 A1 | 1/2009 | Guarnera et al. |
| 2009/0116750 A1 | 5/2009 | Lee et al. |
| 2009/0160957 A1 | 6/2009 | Deng et al. |
| 2009/0257677 A1 | 10/2009 | Cabral et al. |
| 2010/0266201 A1 | 10/2010 | Cabral et al. |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |

| | | |
|---|---|---|
| GB | 2045026 | 10/1980 |
| GB | 2363018 | 5/2001 |
| JP | 61187467 | 8/1986 |
| JP | 62151978 | 7/1987 |
| JP | 07015631 | 1/1995 |
| JP | 8036640 | 2/1996 |
| JP | 08079622 | 3/1996 |
| JP | 2001052194 | 2/2001 |
| JP | 2002207242 | 7/2002 |
| JP | 2003085542 | 3/2003 |
| JP | 2004221838 | 8/2004 |
| JP | 2005094048 | 4/2005 |
| JP | 2005182785 | 7/2005 |
| JP | 2005520442 | 7/2005 |
| JP | 2006025005 | 1/2006 |
| JP | 2006086822 | 3/2006 |
| JP | 2006094494 | 4/2006 |
| JP | 2006121612 | 5/2006 |
| JP | 2006134157 | 5/2006 |
| JP | 2007019959 | 1/2007 |
| JP | 2007148500 | 6/2007 |
| JP | 2007233833 | 9/2007 |
| JP | 2007282158 | 10/2007 |
| JP | 2008085388 | 4/2008 |
| JP | 2008277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at Chapel Hill, Technical Report, p. 1-36.

Kuno et al. "New Interpolation Method Using Discriminated Color Correlation For Digital Still Cameras" IEEE Transac. On Consumer Electronics, vol. 45, No. 1, Feb. 1999, pp. 259-267.

Loop, C., DeRose, T., Generalized B-Spline surfaces o arbitrary topology, Aug. 1990, SIGRAPH 90, pp. 347-356.

M. Halstead, M. Kass, T. DeRose; "efficient, fair interolation using catmull-clark surfaces"; Sep. 1993; Computer Graphics and Interactive Techniques, Proc; pp. 35-44.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www,ideallibrary.com, Real-Time Imaging 8, pp. 317-328, 2002.

T. DeRose, M., Kass, T. Troung; "subdivision surfaces in character animation"; Jul. 1998; Computer Graphics and Interactive Techniques, Proc; pp. 85-94.

Uomori et al., "Automatic Image Stabilizing System by Full-Digital Signal Processing", vol. 36, No. 3, pp. 510-519, Aug. 1990.

Uomori et al., "Electronic Image Stabiliztion System for Video Cameras and VCRS", J. Soc. Motion Pict. Telev. Eng., vol. 101, pp. 66-75, 1992.

"A Pipelined Architecture for Real-Time orrection of Barrel Distortion in Wide-Angle Camera Images", Hau, T. Ngo, Student Member, IEEE and Vijayan K. Asari, Senior Member IEEE, IEEE Transaction on Circuits and Sytstems for Video Technology: vol. 15 No. 3 Mar. 2005 pp. 436-444.

"Calibration and removal of lateral chromatic abberation in images" Mallon, et al. Science Direct Copyright 2006; 11 pages.

"Method of Color Interpolation in a Singe Sensor Color Camera Using Green Channel Seperation" Weerasighe, et al Visual Information Processing Lab, Motorola Austrailian Research Center pp. IV-3233-IV3236, 2002.

D. Doo, M. Sabin "Behaviour of recrusive division surfaces near extraordinary points"; Sep. 197; Computer Aided Design; vol. 10, pp. 356-360.

D.W.H. Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACm SIGGRAPH Jul. 2005, pp. 453-463.

E. Catmull, J. Clark, "recursively enerated B-Spline surfaces on arbitrary topological meshes"; Nov. 1978; Computer aided design; vol. 10; pp. 350-355.

gDEBugger, graphicRemedy, http://www.gremedy.com, Aug. 8, 2006, pp. 1-18.

J. Bolz, P. Schroder; "rapid evaluation of catmull-clark subdivision surfaces"; Web 3D '02.

J. Stam; "Exact Evaluation of Catmull-clark subdivision surfaces at arbitrary parameter values"; Jul. 1998; Computer Graphics; vol. 32; pp. 395-404.

* cited by examiner

80

PER DETECTOR ELEMENT, ACCESS A PIXEL VALUE
81

PER DETECTOR ELEMENT, ACCESS A CORRECTION FACTOR
82

APPLY THE CORRECTION FACTOR TO THE PIXEL VALUE
83

USING A GRAPHICS PROCESSING UNIT TO CORRECT VIDEO AND AUDIO DATA

RELATED U.S. PATENT APPLICATION

This Application is a Continuation (Divisional) Application of the commonly-owned U.S. patent application with Ser. No. 11/272,242, filed Nov. 9, 2005, by M. Wloka, and entitled "Using a Graphics Processing Unit to Correct Video and Audio Data," now U.S. Pat. No. 7,750,956, which is hereby incorporated by reference in its entirety.

FIELD OF THE INVENTION

Embodiments of the present invention generally relate to the processing of data, including digital image data and digital audio data.

BACKGROUND ART

Contemporary wireless telephones, commonly known as cell phones, incorporate many new features such as digital cameras. However, the quality of pictures taken using such "camera phones" is compromised by constraints on cost, weight and size driven by consumers' preferences for smaller and lighter devices. Manufacturers can increase picture quality by using higher quality camera components, such as higher quality lenses or detector arrays. However, a manufacturer must either raise the price of its product to cover the higher cost of the higher quality components, or reduce the number of other features to offset increased costs and maintain current pricing, in either case placing the manufacturer at a competitive disadvantage.

Furthermore, regardless of the quality of the picture-taking components included in a camera phone, such components may degrade with time, reducing picture quality. For instance, a camera phone captures images using a detector array such as a charged coupled device (CCD) or a complementary metal-oxide semiconductor (CMOS) device. A detector element—equivalent to a pixel—may fail or degrade with repeated use, resulting in a dead spot in the captured image data and hence in the rendered image. The user is faced with either accepting lower quality images or purchasing a new camera phone.

A dead or degraded detector element may also be detected as a result of quality checks made during the manufacturing process. Typically, if a detector array includes too many failed or degraded detector elements, it is discarded by the manufacturer. Discarding components that fail quality checks, in particular components that just barely fail to pass, can increase manufacturing costs and hence the price of the product.

SUMMARY OF THE INVENTION

Accordingly, a device and/or method that can improve picture quality in devices such as camera phones, but without a commensurate increase in price, weight or size, would be advantageous. A device and/or method that can achieve this advantage and compensate for component degradation over time would have an additional advantage. A device and/or method that can achieve the above and lower discard rates would have a further advantage. Embodiments in accordance with the present invention provide these and other advantages.

In overview, embodiments in accordance with the present invention pertain to handheld devices, such as but not limited to camera phones, that incorporate a graphics processing unit (GPU). In one embodiment, the GPU is used to post-process image data, in order to correct or compensate for loss of picture quality resulting from manufacturing defects, the use of lower-cost components, or the degradation of components over time.

In one embodiment, a first plurality of pixel values, comprising a first frame of image data, is captured using an array of detector elements. According to an embodiment of the present invention, the pixel values are processed by the GPU to identify any unacceptable pixel values, for example, a pixel value that corresponds to an apparently dead or otherwise malfunctioning detector element. Upon identifying an unacceptable pixel value, the GPU determines a new value for that pixel. In one embodiment, the new value is determined by averaging pixel values associated with detector elements that neighbor the dead or malfunctioning detector element.

In one such embodiment, the GPU identifies an unacceptable pixel value by comparing the first plurality of pixel values to a second plurality of pixel values, the second plurality comprising a second frame of image data, where the second frame is the next frame following the first frame in chronological order. If the pixel values corresponding to the same detector element are the same from the first frame to the second frame, then those pixel values are identified as being potentially unacceptable pixel values.

In another such embodiment, the pixel values are compared over successive frames of image data in real time as each new frame of image data is acquired, in a manner similar to that described above. Associated with each detector element is a counter. The counter's value is incremented each time pixel values corresponding to a same detector element are the same over each pair of successive frames. If the counter value exceeds a threshold value, then the pixel values corresponding to that detector element are considered unacceptable. The counter value is reset to zero each time the pixel values corresponding to the same detector element change from one frame to the next frame.

In another embodiment, if a neighborhood of unacceptable pixel values is identified (for example, a group of pixel values associated with adjacent malfunctioning detector elements is identified), then a multi-pass process is used to determine new pixel values. In each pass, at least one new pixel value is determined by averaging other pixel values, and that new pixel value can be used in subsequent passes to determine yet other pixel values. In this manner, a pixel value corresponding to any detector element can be determined, even if that detector element is surrounded only by other dead or malfunctioning detector elements.

In yet another embodiment, during the manufacturing process, for example, the camera phone is calibrated against benchmark images to quantify any effects introduced by variations in the picture-taking components. For example, a flaw in the lens may distort the image data. A correction factor can be determined for each detector element in the array and stored, for example, in a lookup table (LUT). In such an embodiment, the GPU reads the correction factor associated with a detector element from the LUT and applies that correction factor to the pixel value corresponding to that detector element. In this manner, effects such as but not limited to chromatic aberrations and geometric distortions can be corrected in the image data.

In one more embodiment, audio data is corrected to compensate for variations that may be introduced by recording or playback components. For example, during the manufacturing process, variations in amplitude from a defined ideal can be quantified over a range of audio frequencies. Using this information, correction factors as a function of frequency can be stored, for example, in an LUT and then applied by the GPU to the audio data during recording or playback.

In summary, according to embodiments of the present invention, a GPU in a camera phone, audio player, and similar type of device can be used to improve the quality of image or audio data, without commensurately increasing the cost, weight or size of the device. Indeed, using a GPU in this manner may result in a net cost savings, because lower quality, lower cost components can be used without affecting the picture or sound quality. That is, the GPU can compensate for an effect, if any, that may be introduced by a lower quality/cost component, so that overall quality is virtually indistinguishable from that which may have been realized using a higher quality, higher cost component.

Costs can be further reduced by reducing the discard rate of certain components. For example, if during manufacturing a detector array is determined to have some number of defective elements, the array does not necessarily have to be discarded because the GPU can compensate for the defective elements. In essence, the additional capability provided by the GPU means that a greater number of defects in a component such as a detector array can be tolerated. Because the discard rate is lowered, manufacturing costs and ultimately the cost to consumers can be reduced. In a similar vein, the cost to consumers is reduced because a device does not necessarily have to be replaced should, for example, the detector array start to degrade. Instead, the GPU can compensate for any loss of image data introduced by degradation of the detector array. Consequently, a greater number of failed detector elements can be tolerated before the quality of the rendered image is affected, prolonging the life of the device.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE INVENTION

Figure 1:
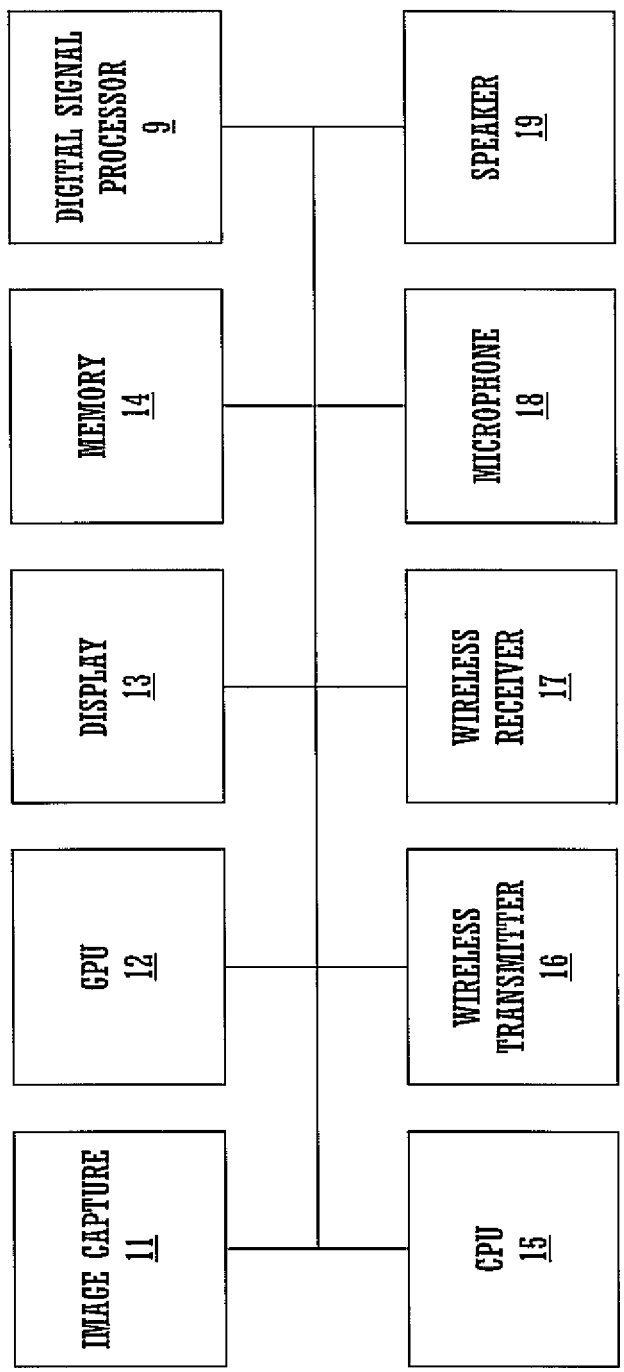
FIG. 1 is a block diagram of an example of a handheld device upon which embodiments according to the present invention may be implemented.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "storing," "displaying," "identifying," "determining," "averaging," "comparing," "incrementing," "setting," "selecting," "transmitting," "receiving," "applying," "adjusting," "accessing" or the like, refer to actions and processes (e.g., flowcharts 70, 80 and 90 of FIGS. 7, 8 and 9, respectively) of a computer system or similar electronic computing device or processor. The computer system or similar electronic computing device manipulates and transforms data represented as physical (electronic) quantities within the computer system memories, registers or other such information storage, transmission or display devices.

FIG. 1 is a block diagram of an example of a handheld device 10 upon which embodiments according to the present invention may be implemented. In the example of FIG. 1, device 10 is described as having certain functional blocks. It is understood that device 10 can include functionality other than that described herein.

In one embodiment, device 10 is a wireless telephone, or cell phone, that incorporates a digital camera or a digital video recorder. In another embodiment, device 10 is a cell phone incorporating an audio recorder and player (e.g., an MP3 player). In yet another, device 10 is a cell phone that incorporates both a digital camera or a digital video recorder and an audio recorder/player. Device 10 may also be a digital camera or an audio recorder/player. Device 10 may include features or functionality other than that just described. For example, device 10 may also be a video game player console or remote control device.

In an embodiment that includes a cell phone and a digital camera, device 10 includes an image capture device 11 (e.g., a detector or sensor array), which may be a charged coupled device (CCD) imager or a complementary metal-oxide semiconductor (CMOS) imager. The image capture device 11 may include lenses and other subcomponents.

In the present embodiment, device 10 also includes memory 14 that stores image data before, during and after processing of that data. Memory 14 may include ROM (read-only memory) and Flash memory.

In one embodiment, device 10 also includes a display 13 for displaying the image captured and represented by the image data, and for displaying menus and commands as part of a user interface. The image data may represent a "still" picture. The image data may also represent a video or movie, because a video is essentially a sequence of still images.

As a cell phone, device 10 includes a wireless transmitter 16 and a wireless receiver 17. A user speaks into microphone 18, and the message is converted into a signal that is transmitted via wireless transmitter 16. A message received via wireless receiver 17 is made audible and broadcast to the user via speaker 19. As a cell phone, device 10 may also include a separate digital signal processor 9. Device 10 can include other cell phone components not described herein but known in the art, such as an analog-to-digital converter.

In an embodiment in which device 10 also includes an audio recorder/player, audio files can be stored in memory 14 and made audible using speaker 19.

Device 10 also includes a graphics processing unit (GPU) 12 that includes the hardware, software and/or firmware necessary for implementing the image data and audio data processing methodologies described herein. Optionally, device 10 also includes a central processing unit (CPU) 15 that operates in parallel with GPU 12.

GPU 12, which may also be referred to as a video processing unit or VPU, is a microprocessor that is very efficient at manipulating and rendering graphical images that are of interest in a variety of electronic games and other applications, which are described further below. GPU 12 can be envisioned as a pipeline through which pixel data pass. GPU 12 receives instructions and data (e.g., graphics primitives) from a host, such as a software application. The data are used to define the image to be produced and displayed. The instructions are used to specify the calculations and operations needed to modify the data to produce rendered images.

The specialized nature of GPU 12 makes it more effective than CPU 15 to handle the range of complex processes involved with processing image or audio data. According to embodiments of the present invention, the image (e.g., pixel) or audio data can be inserted into the pipeline of GPU 12, which is provided with instructions on how to process that data. The type of processing performed by GPU 12 is described more fully in conjunction with FIGS. 3-9, below.

Figure 2:
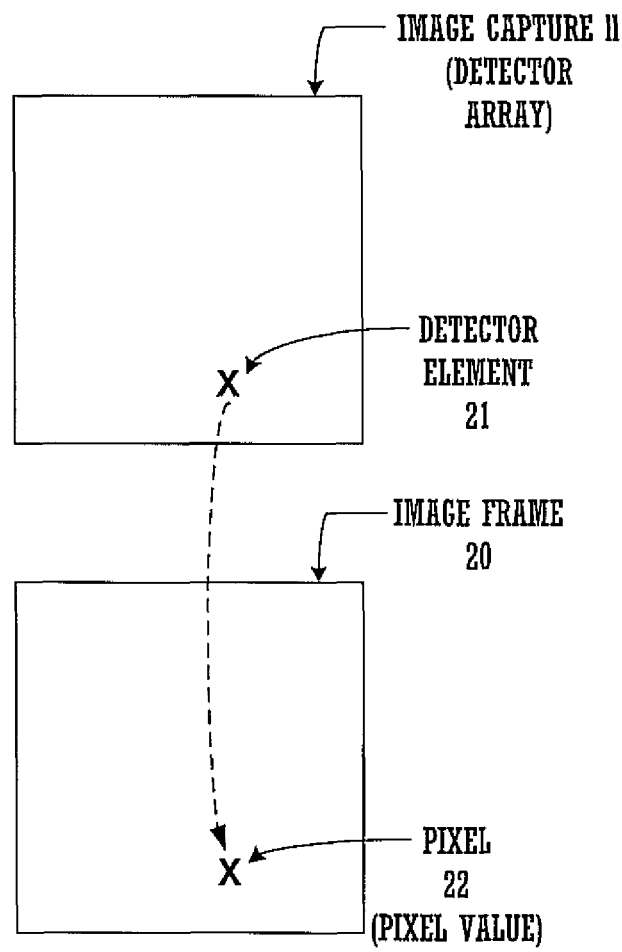
FIG. 2 illustrates the mapping of detector elements in a detector array to pixels and pixel values in an image frame according to one embodiment of the present invention.

FIG. 2 illustrates the mapping of detector elements in an image capture device (or detector array) 11 to pixels and pixel values in an image frame 20 according to one embodiment of the present invention. Detector array 11 includes a number of detector elements or light sensors exemplified by detector element 21. In the present embodiment, for each detector element, a corresponding pixel value, exemplified by pixel value 22, is generated. The detector array 11 is an actual, physical array of detector elements, while the frame of image data 20 can be represented as a virtual array of pixel values as shown in FIG. 2.

Figure 3:
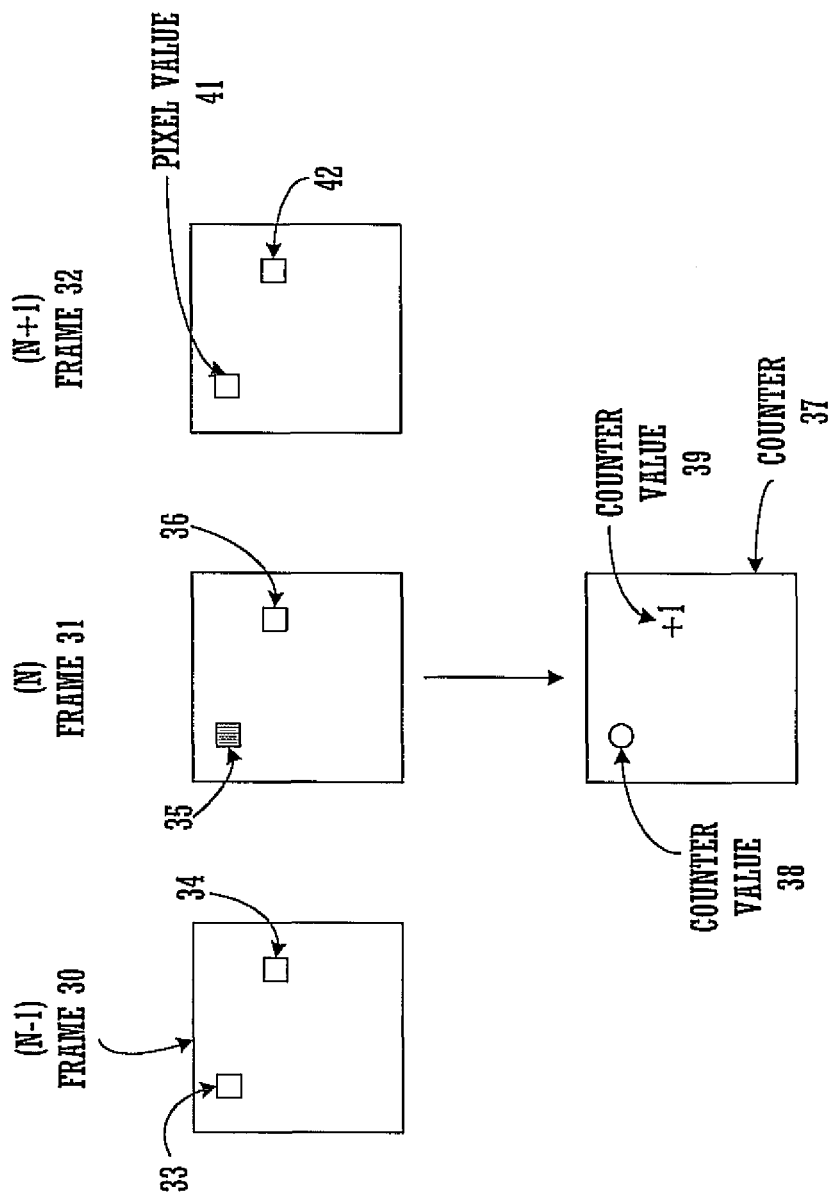
FIG. 3 illustrates successive frames of image data and a counter according to one embodiment of the present invention.

FIG. 3 illustrates successive frames 30, 31 and 32 of image data according to one embodiment of the present invention. That is, frame 32 follows frame 31, and frame 31 follows frame 30, in chronological order. Frames 30, 31 and 32 may represent consecutive frames in a video sequence, and so may be separated by a relatively small time interval. Alternatively, frames 30, 31 and 32 may represent three still images, and as such may be separated by any amount of time.

In the example of FIG. 3, frame 30 includes two example pixel values 33 and 34, frame 31 includes two example pixel values 35 and 36, and frame 32 includes two example pixel values 41 and 42. Pixel values 33, 35 and 41 correspond to the same detector element of a detector array (e.g., detector array 11 of FIG. 2), and pixel values 34, 36 and 42 correspond to the same detector of the detector array 11 (but a different detector element than that associated with pixel values 33, 35 and 41).

Counter 37 represents a virtual array of counter values including exemplary counter values 38 and 39. Counter value 38 corresponds to the detector element that corresponds to pixel values 33, 35 and 41, and counter value 39 corresponds to the detector element that corresponds to pixel values 34, 36 and 42.

Consider an example in which pixel values 33 and 35 are not "considered to be equal," but pixel values 34 and 36 are "considered to be equal." As used herein, the term "considered to be equal" is used to indicate that the pixel values are either exactly equal, or that they are substantially equal (e.g., within a pre-established tolerance). To simplify the remaining discussion, "equal" is used instead of "considered to be equal."

In the example of FIG. 3, because pixel values 33 and 35 are not equal, the counter value 38 is not incremented. However, because pixel values 34 and 36 are equal, counter value 39 is incremented. In general, when pixel values from two successive frames are equal, where the pixel values both correspond to the same detector element, and where the frames are in chronological order, then the counter value corresponding to that detector element is incremented.

The process described by the example of FIG. 3 is continued for each new frame of image data acquired. That is, in one embodiment, when another new frame of image data is acquired, the formerly "new" frame 31 becomes the "last" frame, and the newly acquired frame (e.g., frame 32) becomes the "new" frame. The comparison of pixel values between these two, most recent frames (e.g., frames 31 and 32) is performed as described above.

In the example of FIG. 3, if pixel values 35 and 41 are equal, then counter value 38 is incremented; if they are not equal, then counter value 38 remains at zero. If pixel values 36 and 42 are equal, then counter value 39 is incremented again (e.g., it would have a value of +2). Significantly, if pixel values 36 and 42 are not equal, then counter value 39 is reset to zero.

Thus, according to embodiments of the present invention, a counter value (e.g., counter value 39) will continue to increase for each new frame of image data acquired, if the pixel values corresponding to that counter value remain the same from one frame to the next. In one embodiment, a threshold value is established, such that if a counter value reaches the threshold value, then the pixel values corresponding to that counter value are considered "unacceptable." That is, because the pixel values associated with a same detector element have remained the same over the threshold number of successive frames, those pixel values are presumed to be associated with a detector element that has failed and, as such, those pixel values are considered to be erroneous or unacceptable. In this fashion, a failed detector element is identified by noting that the pixel values associated with that detector element have remained the same over a threshold number of successive (chronologically-ordered) frames.

In one embodiment, once a counter value has reached the threshold value, thus identifying a failed detector element, the counter value is reset to zero only if the pixel value changes, and the process described above is then repeated. Consequently, if a detector element is incorrectly identified as a failed element, it will be subsequently be re-identified as a functioning element.

If a detector element is identified as a failed element, then the pixel values associated with that detector element are presumed to be incorrect. According to embodiments of the present invention, a new pixel value for a failed detector element is determined by averaging or interpolating the pixel values associated with the detector elements that surround, neighbor or are adjacent to the failed detector element. Consequently, the effect of a defective detector element is masked in the rendered image.

Figure 4:
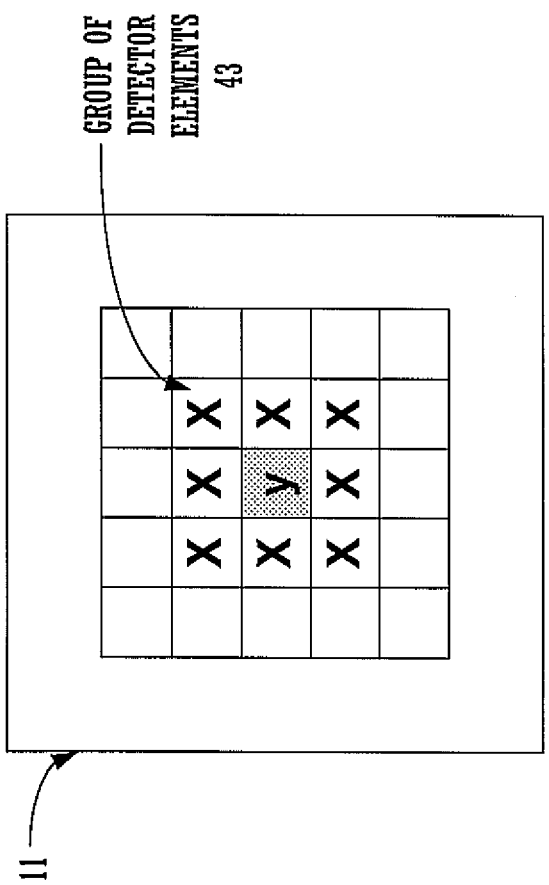
FIG. 4 illustrates a group of failed detector elements in one embodiment of a detector array according to the present invention.

FIG. 4 illustrates a situation in which a group of neighboring or adjacent detector elements 43 are identified as having failed. In such a situation, there may be some detector elements in the group that are neighbored by both failed and functioning detector elements, and other detector elements in the group that are completely surrounded by failed elements. In FIG. 4, an unlabeled element indicates a functioning detector element.

In one embodiment, the situation exemplified in FIG. 4 is addressed using a multi-pass approach to determine pixel values for the failed detector elements X and Y. On a first pass, a pixel value is determined for the failed detector elements X that neighbor functioning detector elements, by averaging or extrapolating the pixel values that correspond to the functioning detector elements. On a next pass, a pixel value is determined for the failed detector element Y, using the pixel values determined for the detector elements X (or a subset of those values).

In this manner, GPU 12 is able to compensate for defects in the image capture device 11. The defects may be introduced as the image capture device 11 degrades over time. However, because GPU 12 can identify the defects and compensate for them, the life of the device 10 can be extended without a noticeable loss of image quality. That is, once defects begin to occur in the image capture device 11, it is not necessary for a user to either tolerate lower quality images or purchase a new device.

The defects may also be detected in the image capture device 11 in quality checks performed during the manufacturing process. However, because GPU 12 can identify the defects and compensate for them, it may not be necessary to discard image capture device 11. In other words, because GPU 12 can compensate for some number of defects, image capture device 11 can have a greater number of defects than what may normally be tolerated; hence, more devices will pass the quality check. Discard rates are thus reduced, lowering costs.

Figure 5:
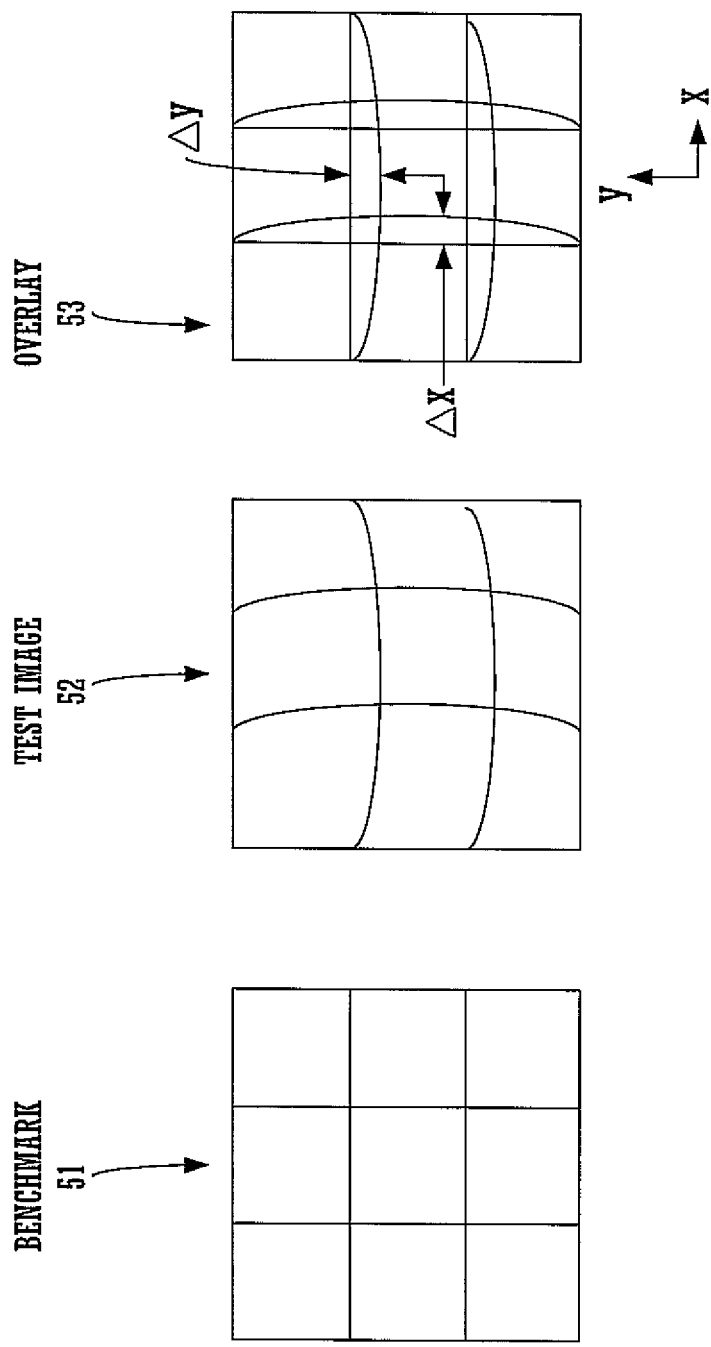
FIG. 5 illustrates an example of a process for calibrating an image capture device according to one embodiment of the present invention.

FIG. 5 illustrates an example of a process for calibrating an image capture device (e.g., image capture device 11 of FIG. 1) according to one embodiment of the present invention.

Benchmark image 51 represents a known, standard image that provides the basis for calibrating the image capture device 11. For example, benchmark 51 can include a set of gridlines that are known to be straight and that are a known distance apart. During the manufacture process, a picture (e.g., test image 52) of benchmark 51 is acquired using device 10 (FIG. 1). The test image 52 is compared to the benchmark 51 to determine distortions that are introduced by the image capture device 11 or by some other component such as the camera lens. Overlay 53 illustrates the comparison between benchmark 51 and test image 52.

Continuing with reference to FIG. 5, the displacements $\Delta x$ and $\Delta y$ associated with each point or pixel value in a frame of image data, and hence for each detector element in the image capture device 11 of FIG. 1, are determined by comparing the test image 52 and the benchmark 51. That is, the displacements $\Delta x$ and $\Delta y$ are determined on a point-by-point (pixel-by-pixel) basis by measuring the difference between a point in benchmark 51 and a corresponding point in test image 52. Points between gridlines can be interpolated to generate a displacement map for the entire array of detector elements. Alternatively, multiple pictures of the benchmark 51 can be taken, each offset slightly from the other, in order to generate a displacement map for the entire array of detector elements. Either or both of the displacement values $\Delta x$ and $\Delta y$ may have a value of zero.

In the present embodiment, correction factors that compensate for the displacements $\Delta x$ and $\Delta y$ are then determined for each detector element. In one embodiment, the correction factors are stored in a lookup table (LUT) that is indexed by detector element—that is, the LUT contains a correction factor for each detector element.

In one embodiment, correction factors are determined for different camera settings (e.g., different focal lengths and aperture settings). In such an embodiment, the LUT is indexed not only by detector element, but by camera setting as well.

In operation, the correction factors can be used as follows. An image is captured (a picture is taken) using device 10 (FIG. 1) to generate a virtual array of pixel values (such as that illustrated in FIG. 2). Each of the pixel values corresponds to a position in the frame of image data, and also corresponds to a particular detector element in the detector array 11 (as illustrated by FIG. 2). Associated with each pixel value in the frame of image data, and equivalently with each detector element, is a correction factor. The appropriate correction factor (indexed by detector element) is read from the LUT and applied by GPU 12 to the appropriate pixel value, correcting the position of the pixel value within the image data. In effect, a pixel value is moved from its position in the captured image data to the position that it should have been in, had the lens not introduced a distortion. In essence, the correction factors map a position at which an instance of image data (e.g., a pixel value) is located in the array of pixel values to the position at which that instance of image data should be in the rendered image, in order to more accurately portray the object that was photographed.

In this manner, GPU 12 is able to compensate for distortions and other effects introduced by distortions and flaws that may be present in imaging components such as lenses. Accordingly, lower quality and hence lower cost components can be used, and manufacturing tolerances on components such as lenses can be increased for additional cost savings. The GPU 12 ensures that the resulting overall quality is virtually indistinguishable from higher cost, higher quality components. Furthermore, because components that may previously have been considered unacceptable can now be used, discard rates can be reduced, also reducing costs.

Correction factors that compensate for effects other than distortion effects can be determined and applied in a similar manner, providing advantages such as those described above. For example, the device 10 (FIG. 1) can be calibrated against a benchmark to determine, for each detector element in the detector array, a correction factor to compensate for color (chromatic) aberrations and color shifts. A color aberration refers to a difference in color between the color captured by image capture device 11 (FIG. 1) and the true color (e.g., the actual color of the object being photographed). A color shift refers to an effect caused because different color wavelengths are transmitted differently through a lens.

Correction factors can be determined for different camera settings (e.g., different focal lengths and aperture settings). Different correction factors can be determined for each color component of a pixel value (e.g., a correction factor for each of the red, green and blue components). The GPU 12 can post-process color aberrations and color shifts per pixel value.

Correction factors can also be determined to correct effects such as spherical aberration, astigmatism, and coma by applying sharpening filters to selected portions of the image data, dependent on camera settings.

Figure 6:
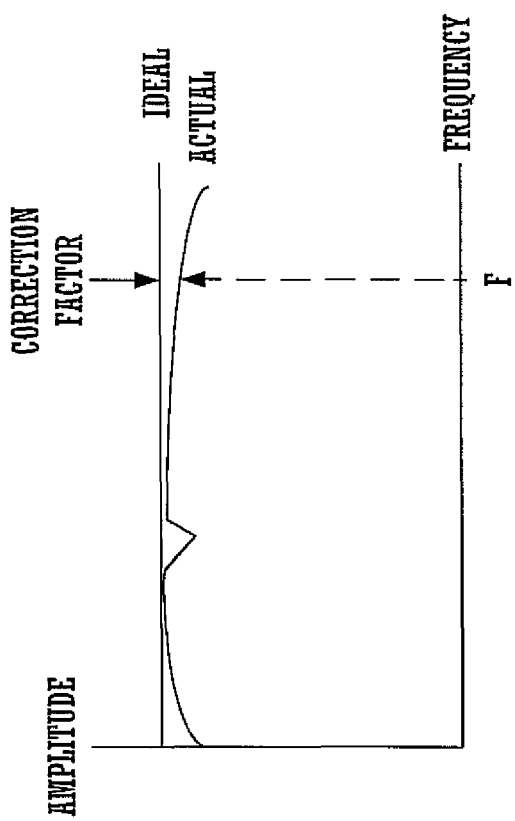
FIG. 6 illustrates an example of a process for calibrating an audio device according to one embodiment of the present invention.

FIG. 6 illustrates an example of a process for calibrating an audio device (e.g., device 10 of FIG. 1) according to one embodiment of the present invention. Ideally, the amplitude of the recorded or played audio is constant across the range of applicable frequencies. In reality, amplitude varies with frequency. In one embodiment, during the manufacturing process, the actual curve of amplitude versus frequency is determined for device 10, during recording and also during playback of a recording. Correction factors that equate the actual amplitude and a defined ideal amplitude as a function of frequency are determined and, in one embodiment, stored in an LUT (e.g., in memory 14 of FIG. 1). In operation, when an instance of audio data is rendered (made audible), the frequency associated with that instance of data is determined and the appropriate correction factor is read by GPU 12 from the LUT and applied to that instance of data.

Figure 7:
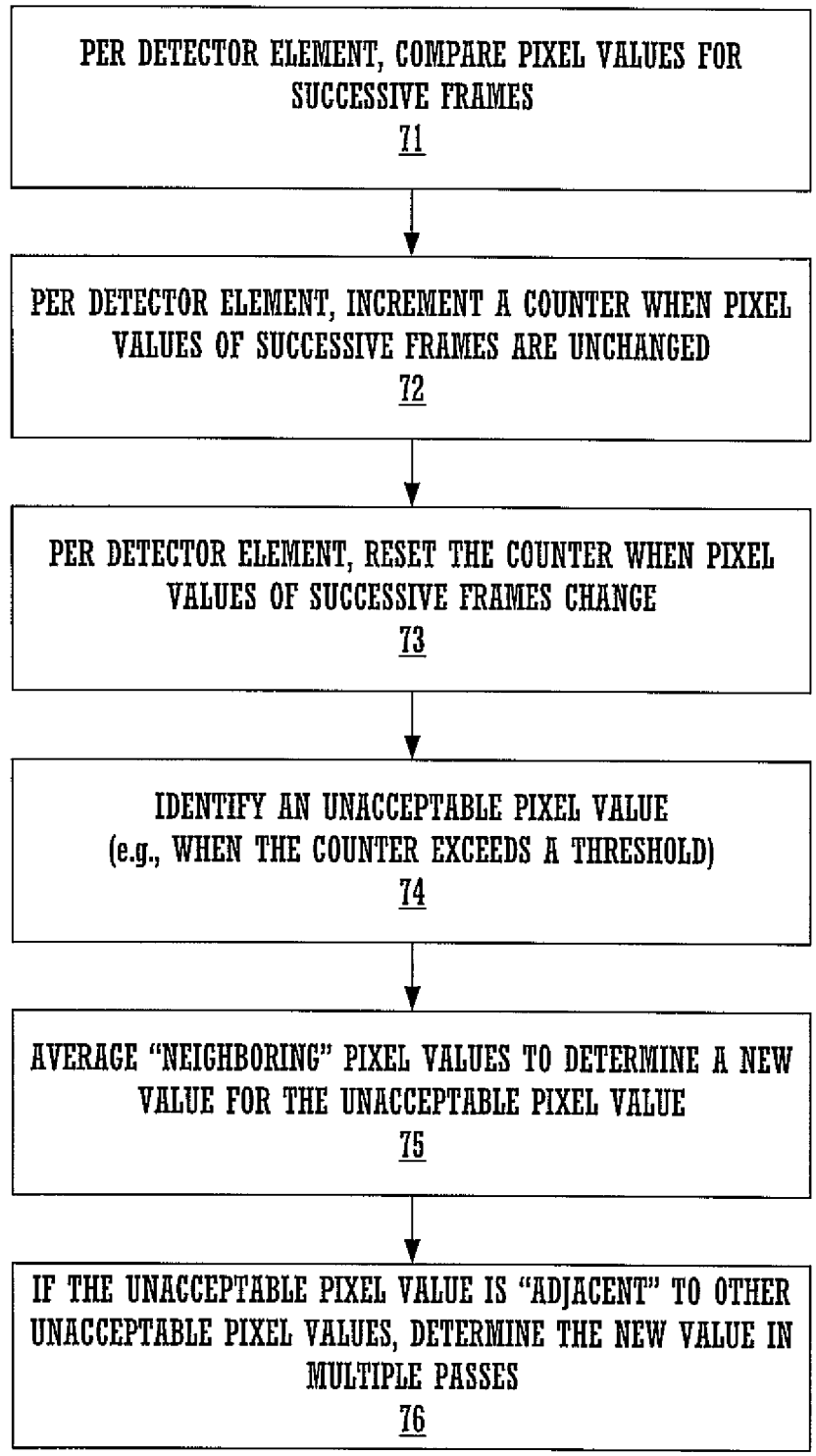
FIG. 7 is a flowchart of a computer-implemented method used by a GPU to process image data according to one embodiment of the present invention.

FIG. 7 is a flowchart 70 of a method used by a GPU to process image data according to one embodiment of the present invention. In one embodiment, flowchart 70 is implemented as program instructions stored in a computer-readable memory unit of device 10 and executed by GPU 12 (FIG. 1).

In block 71 of FIG. 7, an image capture device (e.g., an array of detector elements) generates a first plurality of pixel values comprising a first frame of image data and a second plurality of pixel values comprising a second frame of image data. In one embodiment, the second frame is the frame that is next after the first frame in chronological order. A first pixel value in the first plurality of pixel values is compared to a second pixel value in the second plurality of pixel values. The first pixel value and the second pixel value correspond to a same detector element in a detector array.

In block 72, a counter value associated with a same detector element is incremented each time the pixel values that correspond to that same detector element are considered equal over two successive chronologically-ordered frames. That is, for example, if the abovementioned first pixel value and second pixel value are considered equal, then the counter value associated with the detector element that corresponds to the first and second pixel values is incremented.

In block 73, the counter value is set to zero each time pixel values corresponding to the same detector element are considered not equal over two successive chronologically-ordered frames. In the example above, if the first pixel value and the second pixel value are not considered equal, then the counter value associated with the detector element that corresponds to the first and second pixel values is set to zero.

In block 74, if the counter value satisfies a threshold value, then the pixel values associated with that counter value are identified as unacceptable pixels values. In the example, if the counter value associated with the first and second pixels reaches the threshold value, then the first and second pixel values are defined as being unacceptable. Consequently, the detector element corresponding to the first and second pixel values is considered to be dead or malfunctioning.

In block 75, valid pixel values are averaged or interpolated to determine a new value for any unacceptable pixel values. In the example, a subset of the first plurality of pixel values is averaged to determine a new value for the first pixel. Similarly, a subset of the second plurality of pixel values is averaged to determine a new value for the second pixel. The pixel values in each of the subsets correspond to the detector elements that neighbor the detector element associated with the first and second pixel values.

In block 76 of FIG. 7, in one embodiment, a plurality of unacceptable pixel values is identified, as previously described in conjunction with FIG. 4. The plurality of unacceptable pixel values corresponds to adjacent detector elements in the detector array. A first one of the unacceptable pixel values is selected. A subset of the first plurality of pixel values is averaged to determine a first new pixel value for the first one of the unacceptable pixel values. The subset of pixel values corresponds to the detector elements that neighbor the detector element that corresponds to the first one of the unacceptable pixel values. A second subset of pixel values, where the subset includes the first new pixel value, is averaged to determine a new pixel value for a second one of the unacceptable pixel values. The second subset of pixel values corresponds to detector elements that neighbor the detector element that corresponds to the second one of the unacceptable pixel values.

Figure 8:
FIG. 8 is a flowchart of a computer-implemented method used by a GPU to process image data according to another embodiment of the present invention.
Figure 8:

FIG. 8 is a flowchart 80 of a method used by a GPU to process image data according to another embodiment of the present invention. In one embodiment, flowchart 80 is implemented as program instructions stored in a computer-readable memory unit of device 10 and executed by GPU 12 (FIG. 1).

In block 81 of FIG. 8, an image capture device (e.g., an array of detector elements) generates a plurality of pixel values comprising a frame of image data. A pixel value corresponding to a detector element in the detector array is accessed.

In block 82, a correction factor corresponding to the detector element is accessed. In one embodiment, the correction factor is read from an LUT that is indexed by detector element. In another embodiment, the correction factor is determined by comparing the actual performance of device 10 (FIG. 1) against a benchmark.

In block 83 of FIG. 8, the correction factor is applied to the pixel value. In this manner, the pixel value is compensated to account for effects such as distortion effects, lack of sharpness, color aberrations and color shifts.

Figure 9:
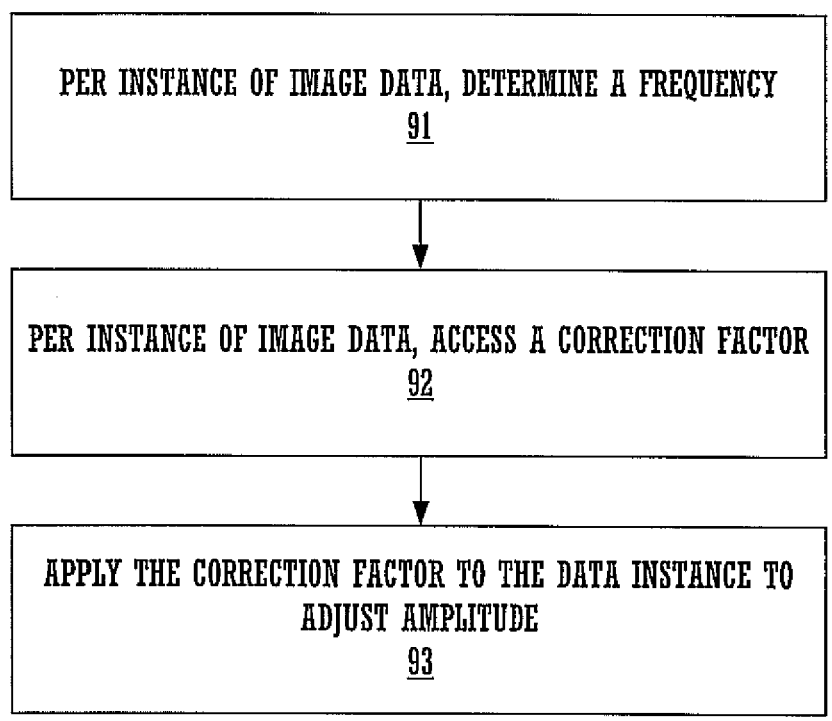
FIG. 9 is a flowchart of a computer-implemented method used by a GPU to process audio data according to one embodiment of the present invention.

FIG. 9 is a flowchart 90 of a method used by a GPU to process audio data according to one embodiment of the present invention. In one embodiment, flowchart 90 is implemented as program instructions stored in a computer-readable memory unit of device 10 and executed by GPU 12 (FIG. 1).

In block 91 of FIG. 9, audio data comprising an audio file is accessed, during recording or playback. A frequency associated with the instance of the audio data is determined.

In block 92, a correction factor corresponding to the frequency is accessed. The correction factor is used to adjust amplitude. In one embodiment, the correction factor is read from an LUT that is indexed by frequency. In another embodiment, the correction factor is determined by comparing the audio performance of device 10 against a benchmark.

In block 93, the correction factor is applied to the instance of audio data. In this manner, the amplitude associated with the instance of audio data is compensated to account for any deviation from an defined ideal amplitude due to shortcomings in the recording of the audio or the playback of the recording.

Although specific steps are disclosed in flowcharts 70, 80 and 90, such steps are exemplary. That is, the present invention is well suited to performing various other steps or variations of the steps recited in flowcharts 70, 80 and 90. It is appreciated that the steps in flowcharts 70, 80 and 90 may be performed in an order different than presented and that the steps in flowcharts 70, 80 and 90 are not necessarily performed in the sequence illustrated.

In summary, according to embodiments of the present invention, a GPU in a camera phone, audio player, and similar type of device can be used to improve the quality of image or audio data, without commensurately increasing the cost, weight or size of the device. Also, the GPU can compensate for any loss of image data introduced by degradation of the image capture device (e.g., the detector array), prolonging the life of the device. In addition, use of a GPU in the manner described herein can reduce discard rates during manufacture. In essence, the additional capability provided by the GPU means that a greater number of defects in a component such as a detector array can be tolerated, and as a result components previously discarded may now be usable. Because the discard rate is lowered, manufacturing costs and ultimately the cost to consumers can be reduced.

Furthermore, the cost of introducing a GPU into a handheld device such as a camera phone is offset because other, lower cost components can be used without affecting the picture or sound quality. That is, the GPU can compensate for an effect, if any, that may be introduced by a lower quality or lower cost component, so that overall quality is not noticeably affected.

Embodiments of the present invention are thus described. While the present invention has been described in particular embodiments, it should be appreciated that the present invention should not be construed as limited by such embodiments, but rather construed according to the below claims.

What is claimed is:

1. A device comprising:
a memory operable to store an audio file comprising digital audio data;
a digital camera comprising an array of detector elements operable to generate a corresponding plurality of pixel values comprising a frame of image data; and
a graphics processing unit (GPU) operable to execute a method of processing said audio data and said pixel values, said method comprising:
determining a frequency associated with an instance of said audio data;
accessing a correction factor corresponding to said frequency, said correction factor for adjusting actual amplitude at said frequency to an ideal amplitude defined for said frequency;
applying said correction factor to said instance of audio data; and
adjusting a pixel value, wherein said adjusting a pixel value comprises:
accessing a memory coupled to said array of detector elements and having stored therein a plurality of chronologically-ordered frames of data generated using said array, each of said frames comprising a plurality of pixel values;
comparing a first pixel value from a first frame of said frames to a second pixel value from a second frame of said frames, wherein said second frame is the next frame following said first frame in chronological order, and wherein said first pixel value and said second pixel value are generated by a same detector element of said array;
incrementing a counter value if said first pixel value and said second pixel value are considered equal and otherwise initializing said counter value;
repeating said comparing for each pixel value generated by said detector element for each of said frames in chronological order;
incrementing said counter value each time pixel values generated by said detector element are considered equal over two successive chronologically-ordered frames and otherwise initializing said counter value;
if said counter value is incremented, then determining whether said counter value exceeds a specified threshold value;
if said counter value exceeds said threshold value, then designating said detector element as defective; and
if said detector element is designated as defective, then calculating new values for pixel values generated by said detector element.

2. The device of claim 1 further comprising a wireless cell phone comprising:
a microphone operable to receive a first audio input;
a wireless transmitter operable to transmit a signal comprising said first audio input;
a receiver operable to receive a wireless signal comprising a second audio input; and
a speaker operable to audibly render said second audio input.

3. The device of claim 1 wherein said calculating comprises averaging a first plurality of pixel values, wherein pixel values in said first plurality correspond to detector elements that neighbor said detector element.

4. The device of claim 1 wherein said calculating comprises:
accessing a correction factor corresponding to said detector element; and
applying said correction factor corresponding to said detector element to said pixel values generated by said detector element.

5. The device of claim 4 wherein said correction factor corresponding to said detector element is read from a lookup table comprising a plurality of correction factors indexed by detector element.

6. The device of claim 4 wherein said correction factor corresponding to said detector element compensates for an effect introduced by a lens that transmits light to said digital camera.

7. The device of claim 4 wherein said correction factor corresponding to said detector element compensates for a difference in color between a color represented by a pixel value generated by said detector element and a benchmark color value.

8. The device of claim 4 wherein said correction factor corresponding to said detector element compensates for loss of sharpness relative to a benchmark.

9. A method comprising:
determining a frequency associated with an instance of digital audio data stored in an audio file in memory;
accessing a correction factor corresponding to said frequency, said correction factor for adjusting actual amplitude at said frequency to an ideal amplitude defined for said frequency;
applying said correction factor to said instance of audio data; and
adjusting a pixel value, wherein said adjusting a pixel value comprises:
  accessing a memory coupled to an array of detector elements and having stored therein a plurality of chronologically-ordered frames of data generated using said array, each of said frames comprising a plurality of pixel values;
  comparing a first pixel value from a first frame of said frames to a second pixel value from a second frame of said frames, wherein said second frame is the next frame following said first frame in chronological order, and wherein said first pixel value and said second pixel value are generated by a same detector element of said array;
  incrementing a counter value if said first pixel value and said second pixel value are considered equal and otherwise initializing said counter value;
  repeating said comparing for each pixel value generated by said detector element for each of said frames in chronological order;
  incrementing said counter value each time pixel values generated by said detector element are considered equal over two successive chronologically-ordered frames and otherwise initializing said counter value;
  if said counter value is incremented, then determining whether said counter value exceeds a specified threshold value;
  if said counter value exceeds said threshold value, then designating said detector element as defective; and
  if said detector element is designated as defective, then calculating new values for pixel values generated by said detector element.

10. The method of claim 9 wherein said calculating comprises averaging a first plurality of pixel values, wherein pixel values in said first plurality correspond to detector elements that neighbor said detector element.

11. The method of claim 9 further comprising:
accessing a correction factor corresponding to said detector element; and
applying said correction factor corresponding to said detector element to said pixel values generated by said detector element.

12. The method of claim 11 further comprising reading said correction factor corresponding to said detector element from a lookup table comprising a plurality of correction factors indexed by detector element.

13. The method of claim 11 further comprising using said correction factor corresponding to said detector element to compensate for an effect introduced by a lens that transmits light to said digital camera.

14. The method of claim 11 further comprising using said correction factor corresponding to said detector element to compensate for a difference in color between a color represented by a pixel value generated by said detector element and a benchmark color value.

15. The method of claim 11 further comprising using said correction factor corresponding to said detector element to compensate for loss of sharpness relative to a benchmark.

* * * * *